Sept. 23, 1969    W. O. GIBSON    3,468,130
SURFACE IRRIGATION DEVICE
Filed Nov. 9, 1967
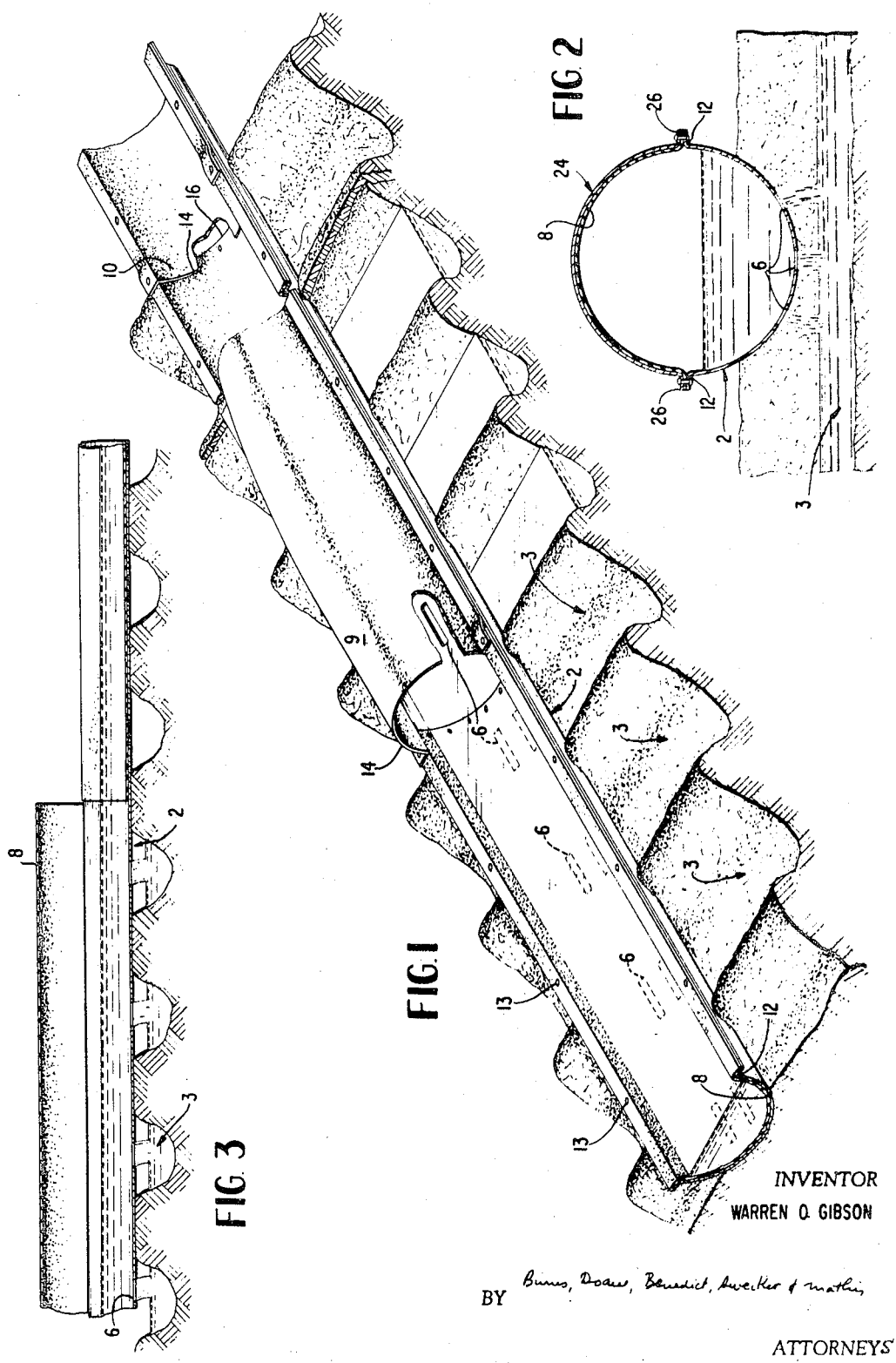
INVENTOR
WARREN O. GIBSON
BY Burns, Doane, Benedict, Swecker & Mathis
ATTORNEYS

United States Patent Office 3,468,130
Patented Sept. 23, 1969

3,468,130
SURFACE IRRIGATION DEVICE
Warren O. Gibson, Kaneohe, Hawaii, assignor to Hawaiian Sugar Planters Association, Honolulu, Hawaii, a voluntary non-profit agricultural organization
Filed Nov. 9, 1967, Ser. No. 681,769
Int. Cl. E02b 13/00
U.S. Cl. 61—12                                    8 Claims

ABSTRACT OF THE DISCLOSURE

A flow controlling irrigation apparatus includes a conduit normally adapted to convey water therealong. A plurality of ports are spaced along the conduit for directing liquid outwardly therefrom. A plurality of flexible diaphragms positioned within the conduit normally overlying and closing said ports are provided. Each diaphragm includes upstream and downstream edges extending generally transversely of the conduit so positioned that each diaphragm normally overlies and closes at least an adjacent one of the ports to prevent passage of liquid through the closed port. Means so connect portions of each diaphragm to the conduit as to permit at least a portion of each diaphragm to be separately, selectively flexed away from the adjacent interior portions of the conduit out of closing relation with an associated port to permit liquid to flow between the upstream edge of the flexed diaphragm and the conduit, thence outwardly through the associated port.

BACKGROUND OF INVENTION

This invention relates to a flow controlling irrigation apparatus used to distribute water for irrigation purposes to agricultural land and the like.

Irrigation of agricultural land is often provided for by directing water along parallel irrigation furrows dug in the surface of the land. Water may be supplied to the furrows by irrigation apparatus extending transversely across the furrows and provided with outlets aligned with the furrows for directing water thereto. Where a large area is to be irrigated, it may be necessary to direct the water from the irrigation apparatus to different furrows at successive times as there may be insufficient water available to supply all of the furrows at the same time.

Previous attempts have therefore been made to provide irrigation apparatus intended to distribute water to the furrows at successive times. Such previous attempts have, for example, included conduits provided with individually controlled outlets positioned adjacent to the furrows so that a workman moving alongside the pipe may manually operate the individual outlets to control the flow of water to the separate furrows in turn. However, such an arrangement requiring separate opening and closing of the individual outlets allows the workman to remain only a limited time at each outlet if he is to get around to all the furrows under his control so that high water flow rates are necessary in order to obtain adequate irrigation of each furrow within the limited time available. This requirement of high water flow necessitates large pipes and associated water handling apparatus which may significantly increase total irrigation costs.

Additionally, such previous devices have in general been characterized by one or more of such factors as undue complexity, high cost, and inability to function for long periods without regular maintenance with the result that no generally satisfactorily low cost, reliable, irrigation system adopted to distribute a limited water supply equally along the length of an irrigation path, is presently available.

SUMMARY OF THE INVENTION

It is therefore a general object of the invention to provide a flow controlling irrigation apparatus intended to obviate or minimize problems of the type previously described.

It is a particular object of the invention to provide a flow controlling irrigation apparatus capable of distributing water to irrigation furrows in groups of several furrows at a time.

It is a further object of the invention to provide a flow controlling irrigation apparatus of the type described, which may be produced and installed at a low cost and which is capable of functioning for long periods without regular maintenance.

In its broadest aspect the invention comprises a flow controlling irrigation apparatus including a longitudinally extending conduit adapted to convey a flow of liquid therealong. The conduit includes a plurality of longitudinally spaced ports for directing liquid outwardly of the conduit. A plurality of thin, flexible, impermeable diaphragms are positioned within the conduit. Each diaphragm includes upstream and downstream edges extending generally transversely of the conduit positioned upstream and downstream respectively of at least an adjacent one of the ports. Each diaphragm overlies adjacent interior portions of the conduit in conforming relation to the interior thereof and surrounds the adjacent port in sealing relation to prevent passage of liquid therethrough. Connecting means fixedly connect portions of each diaphragm to the conduit at points positioned transversely on either side of the adjacent port. The connecting means permit at least portions of each diaphragm to be separately, selectively flexed away from the adjacent portions of the conduit out of sealing relation to permit liquid to flow between the upstream edge of the diaphragm and the conduit, outwardly of the adjacent port.

When used for distributing water to irrigation furrows the conduit is adapted to be positioned extending generally at right angles across the furrows with the various ports aligned with the furrows. Each diaphragm is of sufficient length to control a plurality of the parts spaced along the conduit so that the irrigation furrows may be irrigated in groups of several furrows at a time.

In one embodiment the downstream end of each diaphragm may be fixedly, conformingly secured to the interior of the conduit so that with the upstream portion of the diaphragm in flexed open condition, flow of liquid along the conduit downstream of such flexed diaphragm is prevented.

THE DRAWINGS

Various preferred embodiments of the invention are illustrated in the accompanying drawings in which:

FIGURE 1 is a perspective view of a flow controlling irrigation apparatus according to one preferred embodiment of the invention;

FIGURE 2 is a cross-sectional end view of the flow controlling apparatus shown in FIGURE 1 taken along the lines 2—2 therein, but further including an overlying cover member; and FIGURE 3 is a cross-sectional side view of an alternative embodiment of the invention.

DETAILED DESCRIPTION

Referring to FIGURE 1 of the drawings, a preferred embodiment of the invention thereshown includes a semicircular, longitudinally extending conduit 2 extending generally at right angles across a plurality of parallel irrigation furrows 3 dug in the ground. The conduit 2 is partially buried in the surface of the ground with the underside of the conduit spaced above the bottoms of the furrows 3. The conduit 2 could alternatively be supported on legs above the surface of the ground, if desired.

The conduit 2 includes a plurality of longitudinally spaced downwardly facing sets of restangular ports 6 with a set of ports being aligned with each furrow 3. Water may be selectively directed to fall through the sets of ports 6 into the underlying furrows 3 for distribution therealong. A plurality of identical longitudinally spaced, flexible diaphragms 8–10 are positioned within the conduit 2 lying conformingly against the adjacent interior thereof. The lateral edges of the diaphragms 8–10 are fixedly secured to the conduit 2 along two longitudinally extending, transversely spaced, outwardly directed flanges 12 extending along the upper edges of the conduit 2, by longitudinally spaced connectors 13.

Each of the diaphragms 8–10 as illustrated in FIGURE 1, overlies and closes off water flow through a group of several longitudinally spaced sets of the ports 6 and hence controls water flow to a group of several of the irrigation furrows 3 at a time. The diaphragms may be made of any desired length to control groups of any desired number of the longitudinally spaced sets of ports. In practice, it has been common to utilize diaphragms overlying and closing off groups of about fifteen sets of the longitudinally spaced sets of ports 6 so that water distribution to groups of fifteen irrigation furrows at a time may be controlled.

Each of the diaphragms 8–10 includes a free upstream edge 14 extending transversely of the conduit spaced upstream from the upstream end of the adjacent ports 6 and a transversely extending downstream end 16 spaced downstream of the adjacent ports 6. The downstream edge 16 of each diaphragm extends a short distance downstream beneath the upstream edge 14 of the next diaphragm succeeding and is fixedly, sealingly secured to the adjacent interior of the conduit 2 in conforming relation thereto by suitable connectors 18, such as rivets.

With the diaphragms in the closed condition thus far described (as shown by the diaphragm 8 in FIGURE 1) in which the diaphragm lies conformingly against the interior of the conduit 2, the water flows over the diaphragm along the conduit without being diverted through the adjacent ports 6.

To direct flow outwardly of the conduit an upward force is applied to the free upstream edge 14 of at least one of the flexible diaphragms (see diaphragm 9 in FIGURE 1) thereby uncovering the adjacent groups of two longitudinally spaced sets of ports 6 through which water is directed to the two underlying furrows 3. The flexing force to move the diaphragm may be a simple manual lifting action effected directly by hand or by an instrument held therein, or may be effected by other means not forming a part of the present invention. At the same time, the downstream end 16 of the diaphragm 9 remains fixedly, sealingly secured to the interior of the conduit 2 preventing passage of water between the diaphragm 8 and the conduit 2 so that the flexed diaphragm 9 obstructs and terminates any further downstream flow of water in the conduit.

It will be seen that the diaphragm arrangement described insures that all the flow of water in the conduit at any one time is directed through the group of sets of ports 6 controlled by whichever of the diaphragms in open condition is currently the most upstream. Thus, a water flow to a particular group of several of the irrigation furrows 3 may be effected by causing the relevant diaphragm to have the status of the most upstream, open diaphragm.

Presently, in order to obtain reasonable productivity, a large stream of water is supplied to the laborer, thus necessitating large conduits. A laborer controlling the operation of the diaphragms may control the distribution of water to a large number of furrows and does not need to close individual ports or outlets to furrows as is presently required. This manner of operation permits the laborer to operate several conduits at a time which, in turn, permits the utilization of smaller conduits thereby effecting a significant saving in capital costs; also, this manner of operation increases labor productivity.

If the diaphragms are actuated by timers or other automatic means, thus eliminating the laborer, the conduit size may be greatly reduced as irrigation may be performed on a 24-hour, 7-day-week basis without considering labor productivity. The only consideration in determining conduit size is the necessity to supply sufficient irrigation water to the land. Presently, conduits are oversized in order to meet the need of labor productivity. In many cases conduits are presently designed for flow rates of 5,000 to 10,000 gallons per minute in order to obtain high labor productivity. By use of this device with the membrane actuated by timers or other automatic means, the conduit need only carry a flow rate to meet the irrigation demands which could be as low as 100 to 200 gallons per minute. In practice it has been found that flow rates between 500 and 1500 gallons per minute, depending on a number of factors, result in lowest capital costs.

If it is considered desirable to increase the water flow to certain furrows, this may easily be accommodated by permitting the relevant one of the diaphragms 8–10 to remain in the open, most upstream, condition for a relatively longer period.

The material from which the diaphragms 8–10 are constructed may be any suitable flexible, impermeable, tough, crease resistant sheet material capable of retaining its desirable qualities for long periods under exposure to varying weather conditions. Examples of such materials include sheet rubber (including particularly butyl rubber); polyvinyl chloride; and polyethylene sheeting. However, other suitable materials may be used. It will be appreciated further that any number of diaphragms may be provided dependent upon the length of the conduit and the extent of the land to be irrigated.

Referring to FIGURE 2, a cover 24 coextensive with and similar in shape to the previously mentioned conduit 2, but disposed in relatively inverted relation over and above the conduit 2 may be provided. The cover 24 includes flanges 26 coextensive with and similar to the previously mentioned flanges 12, disposed in overlapping relation therewith. The lateral edges of the various diaphragms 8–10 are sandwiched between the adjacent flanges 26 and 12 with the connectors 13 passing through both flanges 26 and 12 and adjacent portions of the diaphragms. The cover 24 increases the water carrying capacity of the apparatus. Additionally, the cover 24 protects the diaphragms 8 against external weathering and the like effects, excludes unwanted trash such as loose leaves and the like, and adds to the rigidity of the conduit structure.

At various points in the cover 24 it may be necessary to provide suitable openings (not shown) to provide access to the leading edges 14 of the diaphragms 8–10 so that they may be selectively moved between the closed and open positions.

Although the conduit 2 and cover 24 have been disclosed as being of circular form, it will be appreciated that other geometric, regular and irregular shapes such as, for example, rectangular, triangular and polygonal shapes may be provided. Similarly, the ports 6 may be of other than rectangular form, if so desired.

In an alternative embodiment of the invention shown in FIGURE 3, the diaphragms 8 are arranged with the upstream and downstream ends of adjacent diaphragms slightly axially spaced and with the junction between adjacent diaphragms positioned intermediate adjacent sets of the ports 6. Additionally the downstream ends 16 of the various diaphragms 8 are not fixedly secured to the conduit so that moving the diaphragm 8 to the upper position to uncover its associated ports 6 does not terminate flow of water along the conduit downstream of the elevated diaphragm 8 as in the previously described preferred embodiment. It is therefore possible, utilizing the diaphragms shown in the alternative embodiment in FIGURE 3, to irrigate various selected furrows simultaneously.

It will be appreciated that in constructing a flow controlling irrigation apparatus according to the present invention, certain very significant advantages are provided.

In particular, the use of a conduit provided with flexible diaphragms enables a laborer to control flow of water through several conduits at a time, thus permitting the use of smaller conduits. In this manner significant savings in capital costs may be achieved and an increase in labor productivity may be provided.

Also significant is the simple nature of the diaphragms used to control flow which, in conjunction with the long-lasting properties of the materials from which they are made, provides for a low-cost irrigation apparatus capable of functioning for long periods without regular maintenance.

Further significant is the alternative embodiment of the invention utilizing diaphragms which may be selectively operated in any desired sequence to permit simultaneous distribution of fluid from the conduit at various differently spaced points along the length of the conduit.

I claim:

1. A flow controlling irrigation apparatus comprising; a conduit adapted to convey water,
a plurality of ports spaced along said conduit,
a plurality of thin, flexible, diaphragms within said conduit, each of said diaphragms including
upstream and downstream edges extending generally transversely of said conduit positioned upstream and downstream respectively of at least one of said ports, each diaphragm overlying adjacent interior portions of said conduit in conforming relation to the interior thereof to close at least one port; and
connecting means for connecting portions of each diaphragm to said conduit, said connecting means permitting at least the upstream portion of each diaphragm to be selectively flexed away from said adjacent interior portions of said conduit to permit water to flow between said upstream portion of said diaphragm and said conduit outwardly of said port.

2. A flow controlling irrigation apparatus as defined in claim 1, wherein said conduit is adapted to be disposed generally at right angles across a plurality of irrigation furrows with at least one of each said ports aligned with each of the irrigation furrows, each said diaphragm being of sufficient length to extend over a group of at least two said spaced ports to control passage of water to a group of at least two of the furrows at a time.

3. A flow controlling irrigation apparatus as defined in claim 1, further including
means fixedly securing said transverse downstream edge of each said diaphragm to said conduit in peripherally conforming, sealing relation to the interior surface of said conduit to prevent flow of liquid between said downstream edge of said diaphragm and said conduit.

4. A flow controlling apparatus as defined in claim 1, wherein said conduit includes an open upper surface defined by two longitudinally extending edges of said conduit,
said connecting means fixedly connecting portions of said diaphragm to said edges of said conduit to permit portions of said diaphragm to be selectively flexed outwardly of said conduit.

5. A flow controlling irrigation apparatus as defined in claim 1, wherein said conduit comprises a tube having a closed periphery enclosing said diaphragms,
said connecting means connecting portions of said diaphragms to said tube at points spaced transversely on a diameter of said tube.

6. A flow controlling apparatus as defined in claim 1, wherein
said conduit includes a semicircular channel member having longitudinally extending, diametrically opposed upper edges defining an open upper surface of said channel member said connecting means fixedly connecting portions of each of said diaphragms thereof.
to said channel member along said upper edges 7. A flow controlling apparatus as defined in claim 6 further including
means for fixedly securing the downstream edge of each said diaphragm in conforming relation to the interior of said channel member to prevent flow of liquid between said downstream edge of said diaphragm and said channel member.

8. A flow controlling irrigation apparatus comprising, a conduit adapted to convey a flow of liquid along said conduit,
a plurality of ports spaced along said conduit for directing liquid outwardly thereof; and
a plurality of flexible valving members connected with said conduit for selectively closing said ports each said valving member in a closed position thereof cooperating with said conduit to prevent flow of liquid through at least one of said ports, each said valving member being selectively flexed to a position away from at least an adjacent one of said ports to permit liquid flow therethrough, each said valving member in such flexed position thereof concurrently preventing flow of liquid in said conduit downstream of said flexed valving member.

References Cited

UNITED STATES PATENTS

| 547,501 | 10/1895 | Richter | 61—13 |
| 2,148,419 | 2/1939 | Parker | 61—12 X |
| 2,527,047 | 10/1950 | Wold | 61—12 |
| 2,656,682 | 10/1953 | Wold | 61—12 |

FOREIGN PATENTS 23,798    3/1936    Australia.

EARL J. WITMER, Primary Examiner